(12) United States Patent
Zheng et al.

(10) Patent No.: US 12,343,697 B2
(45) Date of Patent: Jul. 1, 2025

(54) CARBON-BASED MICROREACTOR, AND PREPARATION METHOD AND APPLICATION THEREOF

(71) Applicant: OIL CROPS RESEARCH INSTITUTE, CHINESE ACADEMY OF AGRICULTURAL SCIENCES, Wuhan (CN)

(72) Inventors: Mingming Zheng, Wuhan (CN); Tieliang Liu, Wuhan (CN); Yi Zhang, Wuhan (CN); Yuhao Li, Wuhan (CN); Yufei Zhang, Wuhan (CN); Qi Zhou, Wuhan (CN)

(73) Assignee: OIL CROPS RESEARCH INSTITUTE, CHINESE ACADEMY OF AGRICULTURAL SCIENCES, Wuhan (CN)

( * ) Notice: Subject to any disclaimer, the term of this patent is extended or adjusted under 35 U.S.C. 154(b) by 0 days.

(21) Appl. No.: 19/007,769

(22) Filed: Jan. 2, 2025

(65) Prior Publication Data
US 2025/0128233 A1 Apr. 24, 2025

(30) Foreign Application Priority Data
Mar. 18, 2024 (CN) .......................... 202410305178.0

(51) Int. Cl.
*B01J 19/00* (2006.01)
*C01B 32/05* (2017.01)

(52) U.S. Cl.
CPC .... *B01J 19/0093* (2013.01); *B01J 2219/0079* (2013.01); *B01J 2219/00792* (2013.01);
(Continued)

(58) Field of Classification Search
CPC .... B01J 19/00; B01J 19/0093; B01J 2219/00; B01J 2219/00781; B01J 2219/00788;
(Continued)

(56) References Cited

U.S. PATENT DOCUMENTS

| 6,670,039 B1 * | 12/2003 | Nagle ..................... C10B 53/02 |
| | | 428/307.3 |
| 10,818,914 B2 * | 10/2020 | Campbell ............. H01M 4/587 |

FOREIGN PATENT DOCUMENTS

| CN | 109022272 A | 12/2018 |
| CN | 115672316 A | 2/2023 |

OTHER PUBLICATIONS

CNIPA, Notification of First Office Action for Chinese application CN202410305178.0, Jul. 27, 2024.
(Continued)

*Primary Examiner* — Natasha E Young
(74) *Attorney, Agent, or Firm* — Hemisphere Law, PLLC; Zhigang Ma

(57) ABSTRACT

The present invention belongs to the technical field of green catalysis and biosynthesis, and particularly relates to a carbon-based microreactor, and a preparation method and application thereof. According to the present invention, a carbon-based microchannel monolithic column is prepared by utilizing a graded pore structure of regular channels of natural wood in combination with an inorganic salt supporting framework, temperature programmed accurate carbonization and other methods, and then, the multiple advantages of the carbon monolithic column, the microreactor, and immobilized enzyme/chemical catalyst are fully played from the view of key technologies such as carbon-based microreactor construction, operation control, etc. The microreactor has the advantages of low cost, easy access, simple preparation, high flux, high mass and heat transfer efficiency, environmental friendliness, easy mass produc- (Continued)

tion, continuity, automation, suitability for homogeneous and heterogeneous reactions, high product quality, and long-term stable operation.

7 Claims, 5 Drawing Sheets

(52) U.S. Cl.
CPC ............... *B01J 2219/00835* (2013.01); *B01J 2219/00844* (2013.01); *C01B 32/05* (2017.08)

(58) Field of Classification Search
CPC ...... B01J 2219/0079; B01J 2219/00792; B01J 2219/00819; B01J 2219/00835; B01J 2219/00844; C01B 32/00; C01B 32/05
See application file for complete search history.

(56) References Cited

OTHER PUBLICATIONS

CNIPA, Notification to grant patent right for Chinese application CN202410305178.0, Sep. 2, 2024.

\* cited by examiner

CARBON-BASED MICROREACTOR, AND PREPARATION METHOD AND APPLICATION THEREOF

The application claims benefit of Chinese application No. CN202410305178.0, filed Mar. 18, 2024, which is incorporated herein by reference in its entirety.

TECHNICAL FIELD

The present invention belongs to the technical field of green catalysis and biosynthesis, and particularly relates to a carbon-based microreactor, and a preparation method and application thereof.

BACKGROUND

A microreactor is a miniaturized reactor whose size is usually in the range of millimeters to submillimeters. The microreactor has a larger surface area to volume ratio. Attributed to tiny size, the microreactor can provide more reaction surface area in the same volume, thereby helping to improve reaction rate and efficiency. This is because compared with traditional reactors, the microreactor can provide shorter reaction paths and higher mass transfer capacity, thereby shortening reaction time. Secondly, the microreactor has better ability to control heat and mass transfer. As the microreactor has small size, heat and substrates can be rapidly transferred between reactants and products, thereby achieving better temperature and mass transfer control. This can avoid hot spot problems and mass transfer limitations in heterogeneous reactions, and improve the selectivity and yield of the reaction. Thirdly, the microreactor has higher safety and controllability. As the microreactor has small size, the reaction heat can be dissipated more quickly, thereby reducing the risk of explosion and thermal runaway of the reaction. In addition, the size and the structure of the microreactor can be accurately designed and processed to achieve better fluid dynamics and heat and mass transfer effects, thereby achieving better reaction control and stability.

The microreactor has broad application prospects. Firstly, in chemical synthesis, the microreactor can accelerate the reaction rate and improve the selectivity and yield of the products, thereby having wide applications in drug synthesis, chemical production and organic synthesis. Secondly, in the field of energy, the microreactor can be used in the preparation of catalysts, research on fuel cells and hydrogen energy, etc. In addition, the microreactor can be used in bioengineering, environmental protection, food processing, and other fields. However, the current microchannel reactions generally use materials such as glass, silicon carbide, and stainless steel. The channel design and production are relatively cumbersome, and the equipment is also high in cost and easy to break. Special heating and infusion pumps are also provided. The overall equipment cost is high, the operation is relatively complicated, and thus it is difficult to be widely used. Most patents only involve the process optimization of preparing chemicals using commercial microreactors.

Therefore, it is of great significance to develop a microreactor with regular and orderly channels, adjustable size, high physical and chemical stability, simple preparation, low cost, and easy enlargement.

SUMMARY

In view of this, a first purpose of the present invention is to prepare a carbon-based microreactor using microchannel structures of natural wood through the steps of carbonization, chemical/enzyme catalyst immobilization, reaction column preparation, etc., in order to solve the problems existing in the prior art. The novel microreactor has the advantages of regular and orderly channels, adjustable size, high physical and chemical stability, simple preparation, low cost, easy enlargement, and long-term stable operation through immobilized enzyme or chemical catalyst. The microreactor can be widely used in the fields of homogeneous and heterogeneous chemical and enzyme catalysis.

To achieve the above purpose, the present invention adopts the following technical solutions:

A method for preparing a carbon-based microreactor comprises the following steps:

I: preparation of a carbon monolithic column carrier material: soaking cylindrical wood of different sizes in metal ion solution for 24 h, and then taking out and drying at 60-80° C.; and then introducing an inert gas to perform temperature programmed carbonization on the wood at a carbonization temperature of 300-1000° C. to obtain the carbon monolithic column;

II: preparation of a microchannel carbon column: placing the carbon monolithic column obtained in step I in a column tube; filling a gap in the column tube with heat-resistant glue; placing the column tube at a room temperature until the glue is fully solidified; and then loading the catalyst on the carbon monolithic column to obtain the microchannel carbon column; and III: construction of a microreactor: connecting the microchannel carbon column obtained in step II with a preheating coil and a sampling pump to obtain the carbon-based microreactor.

It is worth noting that the present invention uses an impregnation and calcination method to immobilize metal catalysts in situ in the wood channel, and further adsorbs chelatase catalysts to achieve enzyme/chemical tandem catalytic reactions. In addition, the present invention further discloses a method for constructing a complete set of microchannel continuous flow reactor. The obtained carbon-based microreactor has the advantages of regular and orderly channels, adjustable size, high physical and chemical stability, simple preparation, low cost, easy enlargement, and long-term stable operation through immobilized enzyme or chemical catalyst. The microreactor can be widely used in the fields of homogeneous and heterogeneous chemical and enzyme catalysis.

According to the present invention, cylindrical wood is soaked in the metal ion solution to adjust physical properties such as channel size of the carbon monolithic column, catalytic activity and selectivity.

In order to fully realize the present invention, the recommended "temperature programmed carbonization" adopts the following temperature programming: rising to 300° C. at 1° C./min, and insulating for 0.5-1 h at 300° C.; and rising to 500° C. at 1° C./min, and insulating for 0.5-1 h at 500° C. The volume of the carbon column obtained after carbonization shrinks to 50-70% of the volume of the log. However, it should be acknowledged that the condition does not constitute a technical limitation of the present invention. The temperature programmed-based carbonization method obtained based on the prior art without creative work can be used for the implementation of the present invention.

In addition, the present invention can adjust the channel size within the range of 10 m to 150 μm by adjusting the calcination temperature and temperature programming, and utilizing the different carbonization shrinkage ratios of wood at different temperatures and heating rates.

Further, in step I, the cylindrical wood includes basswood, poplar, birch, oak, paulownia, pine, teak, cherry, maple or fir; the metal ion solution includes zinc chloride solution, nickel chloride solution, ferric chloride solution, cupric chloride solution, aluminum chloride solution, zinc sulfate or aluminum sulfate solution; and the inert gas includes $N_2$, Ar or $CO_2$.

It is worth noting that the even-textured parts of trees are selected for columnar cutting to ensure that the original channels of the tree are arranged along the direction of the column height.

Further, in step II: the column tube material includes stainless steel, quartz, carbon steel or polytetrafluoroethylene; the heat-resistant glue includes polytetrafluoroethylene, hot melt glue, solid sol or epoxy resin; and the catalyst includes one or more of enzyme catalyst and chemical catalyst.

It is worth noting that the heat-resistant glue should also have the properties of high temperature resistance, solvent resistance, and acid and alkali resistance.

Further, the enzyme catalyst includes one or more of lipase, phospholipase, protease, oxidase, amylase, and cellulase; and the chemical catalyst includes one or more of metal palladium, platinum, gold, sulfonic acid, p-toluenesulfonic acid, $Zn^{2+}$, $Al^{3+}$, $Fe^{3+}$, $Ni^+$, CaO, MgO, and $CH_3ONa$.

Further, the method for loading the catalyst comprises:

The method for loading the enzyme catalyst includes an adsorption method, an embedding method, a covalent bonding method, a crosslinking method or a metal chelation method.

The method for loading the chemical catalyst includes an impregnation method, an in-situ generation method, the adsorption method or a co-calcination method.

According to the present invention, the construction of the natural carbon-based material microreactor can be realized, wherein the chemical catalyst or the enzyme catalyst can be selectively immobilized to realize specific catalysis or tandem catalysis. The novel microreactor has the advantages of regular and orderly channels, adjustable size, high physical and chemical stability, simple preparation, low cost, easy enlargement, and long-term stable operation through immobilized enzyme or chemical catalyst. The microreactor can be widely used in the fields of homogeneous and heterogeneous chemical and enzyme catalysis.

A second purpose of the present invention is to provide a carbon-based microreactor obtained by the preparation method as described above.

The carbon-based microreactor obtained by the preparation method as described above includes a microchannel carbon column, a preheating coil and a sampling pump, wherein the microchannel carbon column comprises a column tube and a carbon monolithic column, and a catalyst is loaded on the carbon monolithic column; and the carbon monolithic column includes mesoporous-macroporous graded pores with a total pore volume of 1.26-1.85 $cm^3 \cdot g^1$, wherein a mesopore has a diameter of 5-20 nm, a macropore has an average pore diameter of 50-300 μm and a specific surface area of 100-300 $m^2/g$, the number of microchannels is 8,000-20,000 $PCS/cm^2$, and the microchannel size ranges from 10 μm to 150 μm.

It is worth noting that according to the present invention, the microreactor with adjustable pore diameter is prepared based on the natural wood channels, and a plurality of methods are used to immobilize the chemical catalyst or the enzyme catalyst. The microreactor can be widely used in the fields of homogeneous and heterogeneous chemical and enzyme catalysis. The novel microreactor has the advantages of regular and orderly channels, adjustable size, high physical and chemical stability, simple preparation, low cost, easy enlargement, and long-term stable operation through immobilized enzyme or chemical catalyst.

Further, the channel size of the carbon monolithic column is 10-150 μm, and an inner wall of the channel has a pore diameter of 50-200 nm and a thickness of 1-2 μm; and the column tube has a diameter of 2-20 cm and a length of 10-100 cm.

Further, the preheating coil has a length of 2-5 m and a diameter of 1-20 mm.

Further, a plurality of carbon-based microreactors can be connected in series or in parallel.

A third purpose of the present invention is to provide an application of the carbon-based microreactor as described above.

To achieve the above purpose, the present invention adopts the following technical solutions:

The carbon-based microreactor is used in homogeneous and heterogeneous catalytic reactions.

When used, the raw material solution is driven by the sampling pump, heated by the preheating coil, flows through the carbon-based microreactor to complete the reaction, and the product flows out from an outlet.

Considering the complete realization of the technology of the present invention, the recommended flow rate of the microreactor is 1 mL/min-500 mL/min; the enzyme catalytic reaction temperature is 30-70° C.; and the chemical catalytic reaction temperature is 50-150° C.

Further, the catalytic reaction is a chemical and tandem enzyme catalytic reaction.

Further, the catalyst in the catalytic reaction can be recycled.

It is worth noting that, due to the complexity of the microchannel system, it is difficult to collect and reuse the catalyst in the catalytic reaction of the traditional microreactors. According to the present invention, the catalyst is loaded on the carbon monolithic column, which can not only avoid the technical problem of uncontrollable catalyst distribution caused by the complex microchannel system, thereby realizing the long-term stable operation of the enzyme or chemical catalyst, but also realize the recycling of the catalyst, thereby effectively reducing the technical cost of the catalytic reaction and providing the possibility for practical industrial application.

The present invention utilizes the microchannel structure advantages of the natural wood to create a natural carbon-based microreactor that is green, efficient, highly stable, cheap, and easy to enlarge. Compared with the prior art, the present invention has the following beneficial effects:

1) The natural carbon column microreactor has high mass and heat transfer efficiency, and can realize efficient enzyme catalysis or chemical catalysis to prepare functional lipids, active peptides and other functional ingredients for food;
2) The microchannel reaction column prepared by precise carbonization of the natural wood has the advantages of simple operation, low cost, high and adjustable channel regularity, high flow rate, and easy mass production and enlargement;
3) Various reaction modes such as homogeneous catalysis and heterogeneous catalysis can be carried out;
4) The continuous flow reactor is characterized by high relative concentration of catalyst, rapid reaction, and rapid removal of by-products such as water, which promotes the reaction in a positive direction, and has the advantages of complete reaction, few by-products, and easy separation and purification in the later stage;

5) The natural carbon monolithic microreactor has strong rigidity, acid and alkali resistance, high thermal stability and chemical stability, many active groups such as surface carboxyl and hydroxyl groups, and easy surface modification, and can load a variety of chemical and enzyme catalysts, thereby being suitable for different types of reactions such as oxidation, reduction, esterification, and hydrolysis.

6) Metals such as Pt, Au, and Cu can be reduced in the carbonization process, and combined with the immobilized enzymes, and chemical and tandem enzyme catalysis can be achieved.

DESCRIPTION OF DRAWINGS

To more clearly describe the technical solutions in the embodiments of the present invention or in the prior art, the drawings required to be used in the description of the embodiments or the prior art will be simply presented below. The drawings in the following description are merely the embodiments of the present invention, and for those ordinary skilled in the art, other drawings can also be obtained according to the provided drawings without contributing creative labor.

DETAILED DESCRIPTION

Figure 1:
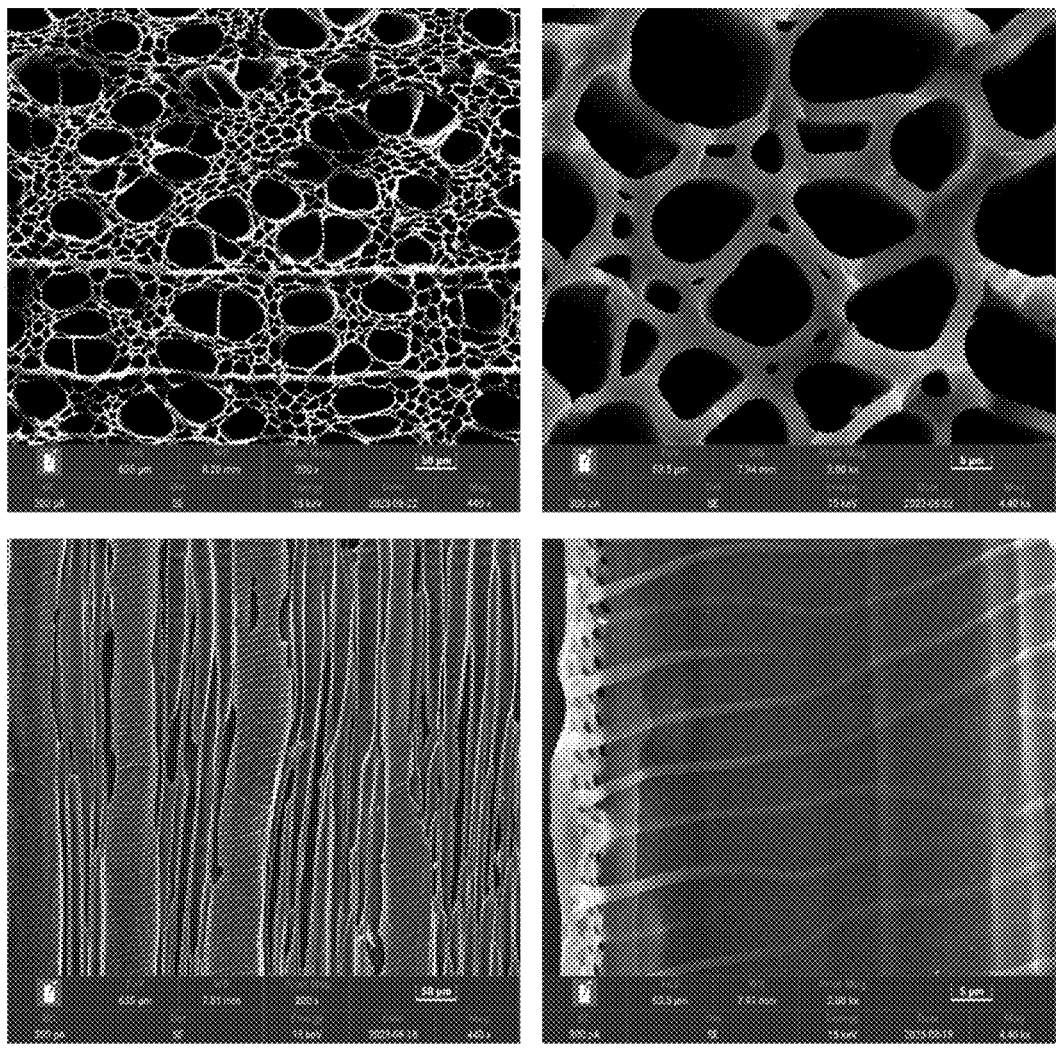
FIG. 1 shows SEM images of a section and a profile of a carbon monolithic column prepared in embodiment 1 of the present invention.

The technical solutions in the embodiments of the present invention will be clearly and fully described below. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Any embodiment described herein by the term "embodiment" as "exemplary" need not be interpreted as superior to or better than other embodiments. Unless otherwise specified, the performance index test in the embodiments of the present application uses the conventional test methods in the field. It should be understood that the terms in the present application are only intended to describe particular embodiments and not intended to limit the disclosure of the present application.

Unless otherwise specified, the technical and scientific terms used herein have the same meanings as those generally understood by those ordinary skilled in the technical field to which the present application belongs. Other test methods and technical means not specifically indicated in the present application refer to the experiment methods and technical means generally used by those ordinary skilled in the art.

It should be understood in the description of the present invention that terms such as "central", "upper", "lower", "up", "down", "vertical", "surface", "top", "bottom", "inner", "outer", etc. indicate direction or position relationships shown based on the drawings, and are only intended to facilitate the description of the present invention and the simplification of the description rather than to indicate or imply that the indicated device or element must have a specific direction or constructed and operated in a specific direction, and therefore, shall not be understood as a limitation to the present invention.

To better explain the content of the present application, numerous specific details are given in the specific embodiments below. Those skilled in the art should understand that the present application can be implemented without certain specific details. In embodiments, some methods, means, instruments, equipment, etc. well known to those skilled in the art are not described in detail in order to highlight the purport of the present application.

On the premise of no conflict, the technical features disclosed in the embodiments of the present application can be arbitrarily combined, and the obtained technical solution belongs to the disclosure of the embodiments of the present application.

The present invention belongs to the technical field of green catalysis and biosynthesis, and particularly relates to a carbon-based microreactor, and a preparation method and application thereof. According to the present invention, a carbon-based microchannel monolithic column is prepared by utilizing a graded pore structure of regular channels of natural wood in combination with an inorganic salt supporting framework, temperature programmed accurate carbonization and other methods, and then, the multiple advantages of the carbon monolithic column, the microreactor, and immobilized enzyme/chemical catalyst are fully played from the view of key technologies such as carbon-based microreactor construction, operation control, etc. The microreactor has the advantages of low cost, easy access, simple preparation, high flux, high mass and heat transfer efficiency, environmental friendliness, easy mass production, continuity, automation, suitability for homogeneous and heterogeneous reactions, high product quality, and long-term stable operation.

The method for preparing a carbon-based microreactor disclosed by the present invention comprises:

1) The cut wood column was ultrasonically cleaned twice with ultrapure water and dehydrated in an oven at 50-105° C. The wood column was soaked in different metal ion solutions for 12-24 h and then dried in the oven at 50-70° C. for 12 h. Then, under nitrogen protection, the column was heated to 300-1000° C. at a heating rate of 3-10° C./min and calcined for 3-6 h.

2) The obtained carbon monolithic column was fixed in a metal column sleeve with heat-resistant glue, and two ends thereof were fixed with clamps.

3) The ultrapure water, phosphate buffer and enzyme solution passed through the carbon monolithic column from bottom to top in sequence, and the carbon monolithic column was freeze-dried for 12-36 h to obtain a natural carbon microreactor which can be used for a variety of reactions.

To better understand the present invention, the present invention is further described in detail below by the following embodiments, but shall not be interpreted as a limitation to the present invention. Some non-essential improvements and adjustments made by those skilled in the art according to the contents of the present invention shall also be deemed to fall within the protection scope of the present invention.

Embodiment 1

Figure 5:
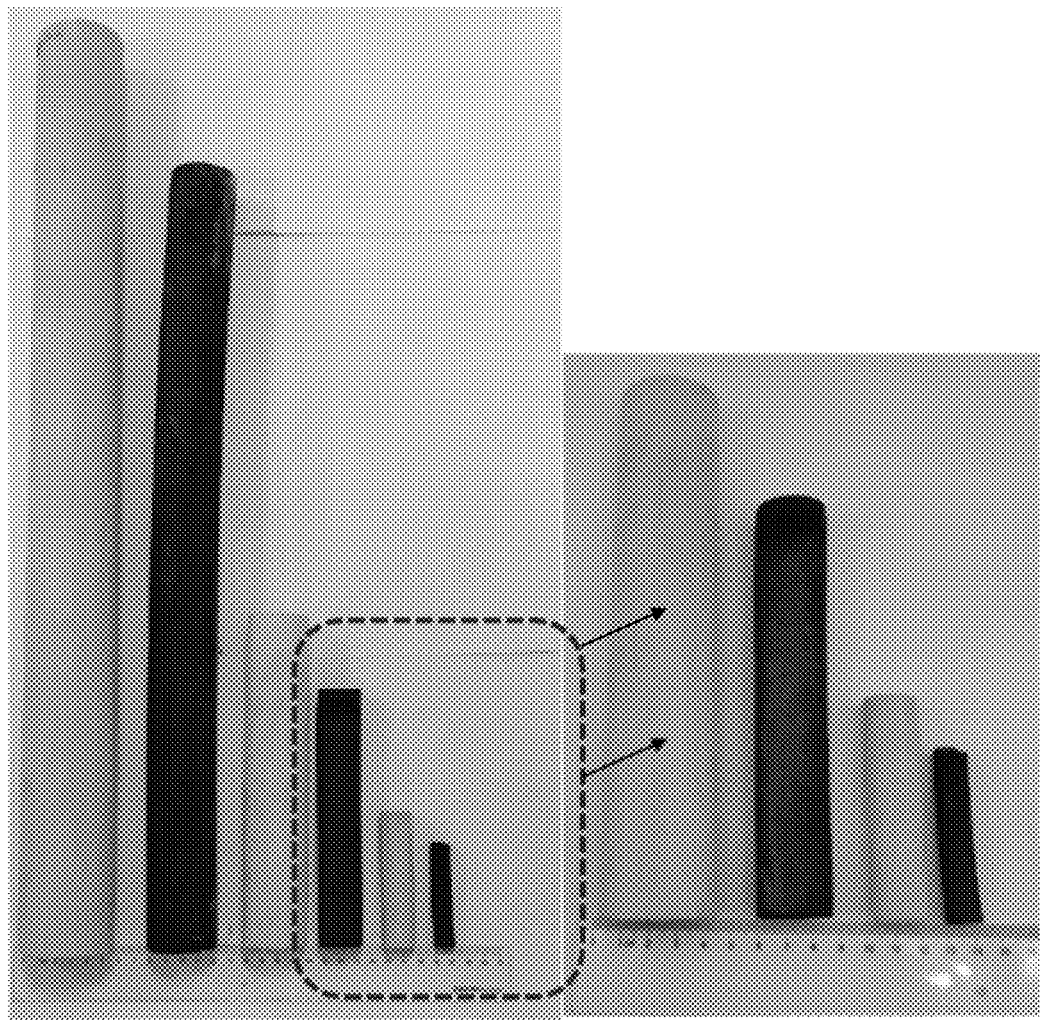
FIG. 5 shows the image of the carbon monolithic columns of different sizes prepared in embodiments 1-4 of the present invention.

A basswood column with a diameter of 2 cm and a length of 10 cm was soaked in $Ni^{2+}$ solution for 24 h, and then dried in an oven at 70° C. for 12 h. Then, under nitrogen protection, the column was heated to 700° C. at a heating rate of 5° C./min and calcined for 3 h. SEM images of a cross section and a profile of the obtained carbon monolithic column are shown in FIG. 1, and the real appearance picture is shown in FIG. 5.

The obtained carbon monolithic column was fixed in a metal column sleeve with epoxy resin glue, and two ends thereof were fixed with clamps. The ultrapure water, phosphate buffer and CALB lipase solution passed through the carbon monolithic column from bottom to top in sequence, and the carbon monolithic column was freeze-dried for 24 h to obtain a natural carbon microchannel enzyme reactor.

3.16 mL of hexanoic acid and 6.32 mL of hexanol were dissolved in 84 mL of n-hexane in a molar ratio of 1:2 to prepare reaction solution, which then passed through a carbon monolithic microreactor at a flow rate of 0.4 mL/min, and heterogeneous enzyme-catalyzed esterification was performed at 40° C. to prepare hexyl hexanoate.

Figure 3:
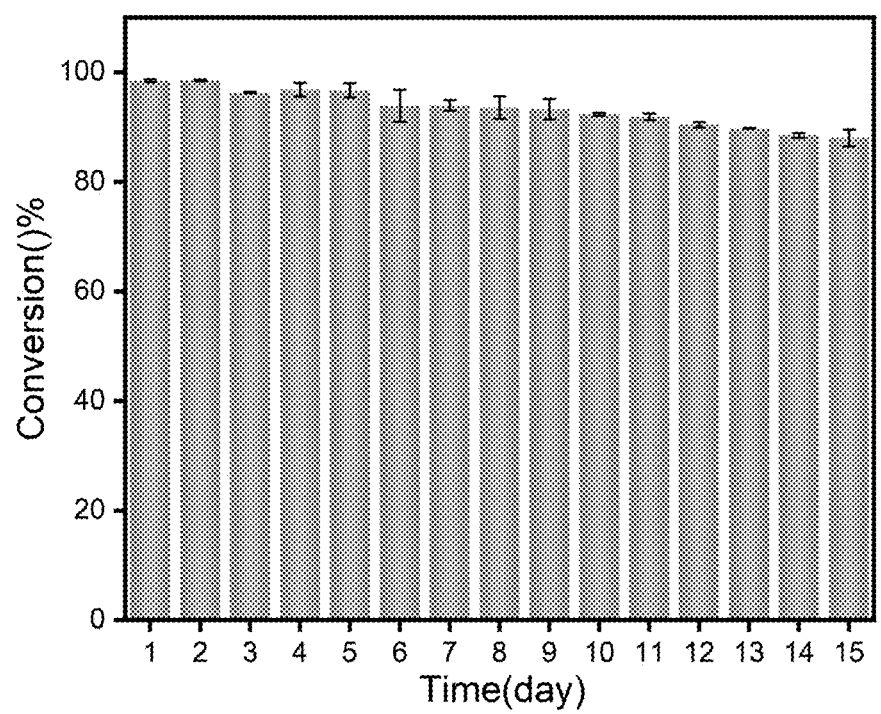
FIG. 3 is a diagram showing the catalytic synthesis of flavor ester using the carbon monolithic column prepared in embodiment 1 of the present invention for 15 consecutive days.
Figure 4:
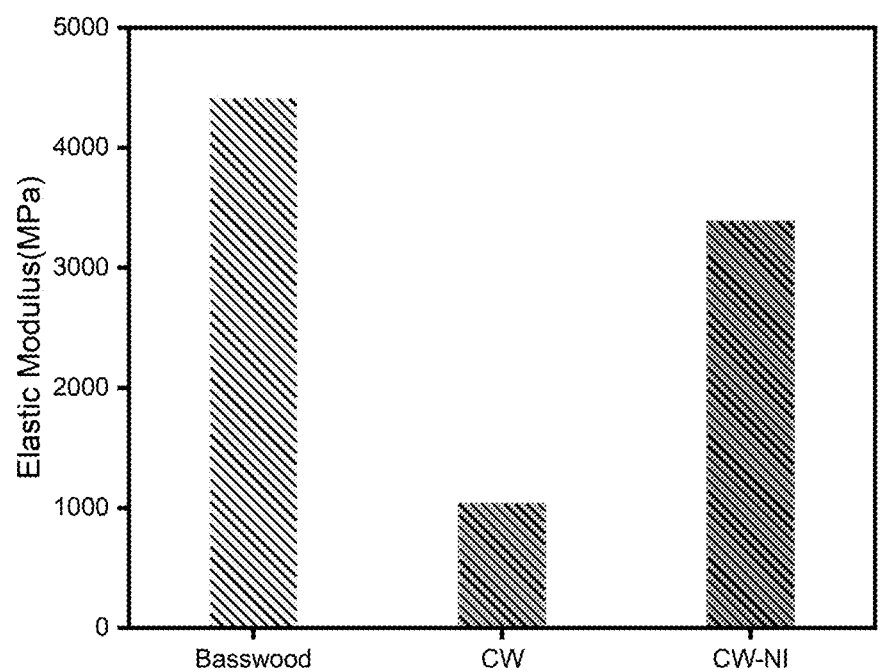
FIG. 4 shows the physical compression ability of the carbon monolithic column of the present invention before calcination, after calcination and after immobilization of Ni metal catalyst.

The conversion rate of the flavor ester hexyl hexanoate was determined to be 99.2%. After repeated use for 15 consecutive days, the results are shown in FIG. 3. It can be seen that the conversion rate of the flavor ester hexyl hexanoate is still maintained above 90%, and the carbon monolithic microreactor has strong stability and industrial applicability.

Embodiment 2

A pine column with a diameter of 2 cm and a length of 12 cm was soaked in $Zn^{2+}$ solution for 12 h, and then dried in an oven at 90° C. for 12 h. Then, under Ar gas protection, the column was heated to 800° C. at a heating rate of 6° C./min and calcined for 4 h. The real appearance picture is shown in FIG. 5. The obtained carbon monolithic column was fixed in a metal column sleeve with epoxy resin glue, and two ends thereof were fixed with clamps. The ultrapure water, phosphate buffer and lipase CALB solution passed through the carbon monolithic column from bottom to top in sequence, and the carbon monolithic column was freeze-dried for 24 h to obtain a natural carbon microchannel enzyme reactor.

3.16 mL of hexanoic acid and 2.94 mL of ethanol were dissolved in 80 mL of n-hexane in a molar ratio of 1:2 to prepare reaction solution, which then passed through a carbon monolithic microreactor at a flow rate of 0.2 mL/min, and heterogeneous enzyme-catalyzed esterification was performed at 35° C. to prepare ethyl hexanoate.

The conversion rate of the flavor ester ethyl hexanoate was determined to be 95.5%.

Embodiment 3

A birch column with a diameter of 5 cm and a length of 25 cm was soaked in ultrapure water for 2 h, and then dried in an oven at 100° C. for 10 h. Then, under nitrogen protection, the column was heated to 700° C. at a heating rate of 10° C./min and calcined for 3 h. The real appearance picture is shown in FIG. 5. The obtained carbon monolithic column was fixed in a metal column sleeve with epoxy resin glue, and two ends thereof were fixed with clamps. The ultrapure water, phosphate buffer and PS-SD lipase solution passed through the carbon monolithic column from bottom to top in sequence, and the carbon monolithic column was freeze-dried for 36 h to obtain a natural carbon microchannel enzyme reactor.

22 g of triglyceride and 1.15 g of glycerol were uniformly mixed to prepare reaction solution, which then passed through a carbon monolithic microreactor at a flow rate of 8 mL/min, and heterogeneous enzyme-catalyzed esterification was performed at 60° C. to prepare diglyceride-rich oil.

The content of diglyceride in the oil was determined to be 48.2%.

Embodiment 4

A teak column with a diameter of 10 cm and a length of 50 cm was soaked in $Al^{3+}$ solution for 24 h, and then dried in an oven at 60° C. for 18 h. Then, under nitrogen protection, the column was heated to 900° C. at a heating rate of 5° C./min and calcined for 3 h. The real appearance picture is shown in FIG. 5. The obtained carbon monolithic column was fixed in a metal column sleeve with epoxy resin glue, and two ends thereof were fixed with clamps. The ultrapure water, phosphate buffer and AYS lipase solution passed through the carbon monolithic column from bottom to top in sequence, and the carbon monolithic column was freeze-dried for 24 h to obtain a natural carbon microchannel enzyme reactor.

41.4 g of sterol and 42.0 g of sunflower oil fatty acid were uniformly mixed to prepare reaction solution, which then passed through a carbon monolithic microreactor at a flow rate of 30 mL/min, and heterogeneous enzyme-catalyzed esterification was performed at 60° C. to prepare sterol ester.

The conversion rate of the sterol ester was determined to be 92.4%. In addition, from the real picture of the carbon monolithic column obtained in embodiments 1-4 (FIG. 5), it can be seen that the present invention can prepare carbon monolithic column reactors of different sizes, which are easy to enlargement and suitable for large-scale production needs.

Embodiment 5

A cherry column with a diameter of 7 cm and a length of 50 cm was soaked in $Fe^{3+}$ solution for 24 h, and then dried in an oven at 50° C. for 10 h. Then, under nitrogen protection, the column was heated to 500° C. at a heating rate of 3° C./min and calcined for 3 h. The obtained carbon monolithic column was fixed in a metal column sleeve with epoxy resin glue, and two ends thereof were fixed with clamps. The ultrapure water, phosphate buffer and protease solution passed through the carbon monolithic column from bottom to top in sequence, and the carbon monolithic column was freeze-dried for 24 h to obtain a natural carbon microchannel enzyme reactor.

The casein was dissolved in buffer solution of pH 7.0 to prepare reaction solution, which then passed through a carbon monolithic microreactor at a flow rate of 80 mL/min, and heterogeneous enzymatic hydrolysis was performed at 60° C. to prepare a polypeptide.

The yield of the polypeptide was determined to be 85.5%.

Embodiment 6

A fir column with a diameter of 10 cm and a length of 30 cm was soaked in $Cu^{2+}$ solution for 24 h, and then dried in an oven at 80° C. for 12 h. Then, under nitrogen protection, the column was heated to 600° C. at a heating rate of 5° C./min and calcined for 4 h. Wherein the copper ion can be reduced to metal copper under high temperature and nitrogen atmosphere. The obtained carbon monolithic column was fixed in a metal column sleeve with epoxy resin glue, and two ends thereof were fixed with clamps. The carbon monolithic column was cleaned by the ultrapure water from bottom to top, and dried to obtain a natural carbon microreactor.

Preparation of reaction solution: 14.8 g of cinnamic acid was heated and dissolved in 200 mL of ethanol; 0.3 g of p-toluenesulfonic acid catalyst was added to prepare the reaction solution, which then passed through a carbon monolithic microreactor at a flow rate of 60 mL/min; and homogeneous acid-catalyzed esterification was performed at 55° C. to prepare butyl cinnamate.

The yield of the ethyl cinnamate was determined to be 95.2%.

Embodiment 7

A poplar column with a diameter of 20 cm and a length of 100 cm was soaked in $Na^{2+}$ solution for 12 h, and then dried in an oven at 70° C. for 12 h. Then, under nitrogen protection, the column was heated to 850° C. at a heating rate of 10° C./min and calcined for 6 h. The obtained carbon monolithic column was fixed in a metal column sleeve with epoxy resin glue, and two ends thereof were fixed with clamps. The ultrapure water, phosphate buffer and lipase solution passed through the carbon monolithic column from bottom to top in sequence, and the carbon monolithic column was freeze-dried for 24 h to obtain a natural carbon microchannel enzyme reactor.

17.6 g of L-ascorbic acid and 38.4 g of palmitic acid were heated and dissolved in 500 mL of tert-butyl alcohol to prepare reaction solution, which then passed through a carbon monolithic microreactor at a flow rate of 500 mL/min, and heterogeneous enzyme-catalyzed esterification was performed at 70° C. to prepare L-ascorbyl palmitate.

The conversion rate of the L-ascorbyl palmitate was determined to be 75.2%.

Embodiment 8

Figure 2:
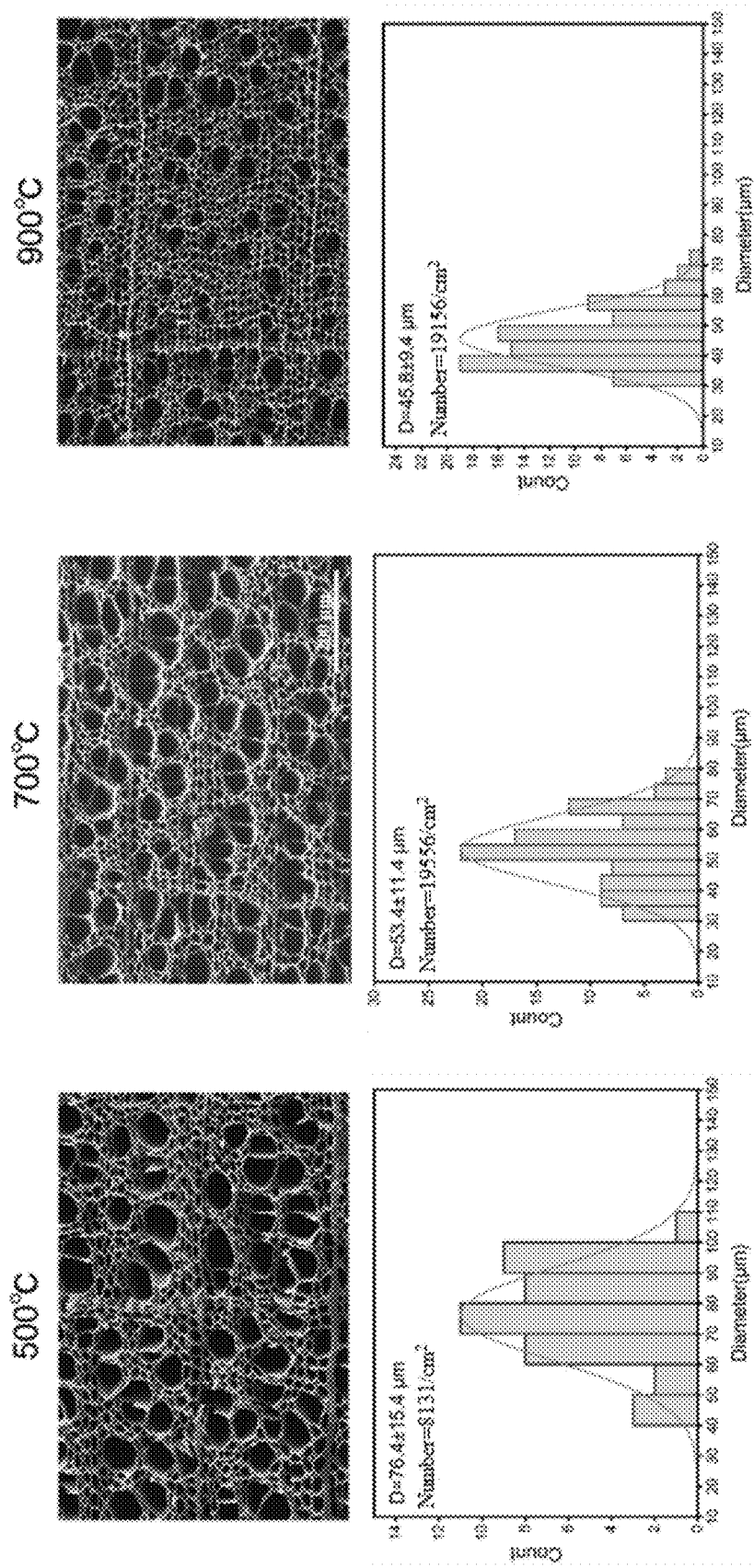
FIG. 2 shows a SEM sectional view of the carbon monolithic column prepared by calcining the wood of the present invention at different temperatures and a Gaussian distribution diagram of the microchannel pore diameter, corresponding to embodiment 5 (500° C.), embodiment 1 (700° C.), and embodiment 4 (900° C.), respectively.

The carbon monolithic column prepared by calcining at different temperatures in embodiments 1, 4 and 5 were morphologically characterized, and the obtained SEM sectional view and the Gaussian distribution diagram of the microchannel pore diameter are shown in FIG. 2. It can be seen that as the calcination temperature increases, the microchannel diameter gradually decreases, and the number of channels first increases and then decreases.

Embodiment 9

The mechanical strength of the nickel-containing carbon-based monolithic column in embodiment 1 was compared with that of the original wood and the carbon monolithic column. The results showed that the mechanical strength of the carbon monolithic column was significantly lower than that of the original wood, which was only 20% of that of the wood. After loading metal nickel, the mechanical strength was significantly improved, which was about 70% of that of the wood.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A method for preparing a carbon-based microreactor, comprising the following steps:

I: preparation of a carbon monolithic column carrier material: soaking cylindrical wood of different sizes in metal ion solution for 24 h, and then taking out and drying at 60-80° C.; then introducing an inert gas to perform heating and carbonization by a heating rate of 3-10° C./min on the wood at a carbonization temperature of 300-1000° C.; and calcining for 3-6 h to obtain the carbon monolithic column;

II: preparation of a microchannel carbon column: placing the carbon monolithic column obtained in step I in a column tube; filling a gap in the column tube with heat-resistant glue; placing the column tube at a room temperature until the glue is fully solidified; and then loading the catalyst on the carbon monolithic column to obtain the microchannel carbon column; and III: construction of a microreactor: connecting the microchannel carbon column obtained in step II is to a preheating coil and a sampling pump to obtain the carbon-based microreactor;

wherein in step I:

the cylindrical wood comprises basswood, poplar, birch, oak, paulownia, pine, teak, cherry, maple or fir;

the metal ion solution comprises zinc chloride solution, nickel chloride solution, ferric chloride solution, cupric chloride solution, aluminum chloride solution, zinc sulfate or aluminum sulfate solution;

the inert gas comprises $N_2$, Ar or $CO_2$;

in step II:

the column tube material comprises stainless steel, quartz, carbon steel or polytetrafluoroethylene;

the heat-resistant glue comprises polytetrafluoroethylene, hot melt glue, solid sol or epoxy resin;

the catalyst is an enzyme catalyst;

the enzyme catalyst comprises one or more of lipase, phospholipase, protease, oxidase, amylase, and cellulase;

a method for loading the enzyme catalyst comprises an adsorption method, an embedding method, a covalent bonding method, a crosslinking method or a metal chelation method.

2. A carbon-based microreactor prepared by the preparation method according to claim 1, comprising a microchannel carbon column, a preheating coil and a sampling pump, wherein the microchannel carbon column comprises a column tube and a carbon monolithic column, and a catalyst is loaded on the carbon monolithic column; and the carbon monolithic column comprises mesoporous-macroporous graded pores with a total pore volume of 1.26-1.85 $cm^3 \cdot g^{-1}$, wherein a mesopore has a diameter of 5-20 nm, a macropore has an average pore diameter of 50-300 μm and a specific surface area of 100-300 m²/g, the number of microchannels is 8,000-20,000 PCS/cm², and the microchannel size ranges from 10 μm to 150 μm; the channel size of the carbon monolithic column is 10-150 μm, and an inner wall of the channel has a pore diameter of 50-200 nm and a thickness of 1-2 μm; and the column tube has a diameter of 2-20 cm and a length of 10-100 cm.

3. The carbon-based microreactor according to claim 2, wherein the preheating coil has a length of 2-5 m and a diameter of 1-20 mm.

4. The carbon-based microreactor according to claim 2, wherein the carbon-based microreactor is configured to be connected, in series or in parallel, with other carbon-based microreactor when a plurality of carbon-based microreactors are provided.

5. An application of the carbon-based microreactor according to claim 2, wherein the carbon-based microreactor is used in homogeneous and heterogeneous catalytic reactions.

6. The application of the microreactor according to claim 5, wherein the catalytic reaction is a chemical and tandem enzyme catalytic reaction.

7. The application of the microreactor according to claim 5, wherein the catalyst in the catalytic reaction can be recycled.

* * * * *